July 24, 1928.
J. L. SCHLITT ET AL
REFRIGERATION
Filed April 20, 1925  2 Sheets-Sheet 1
1,678,485
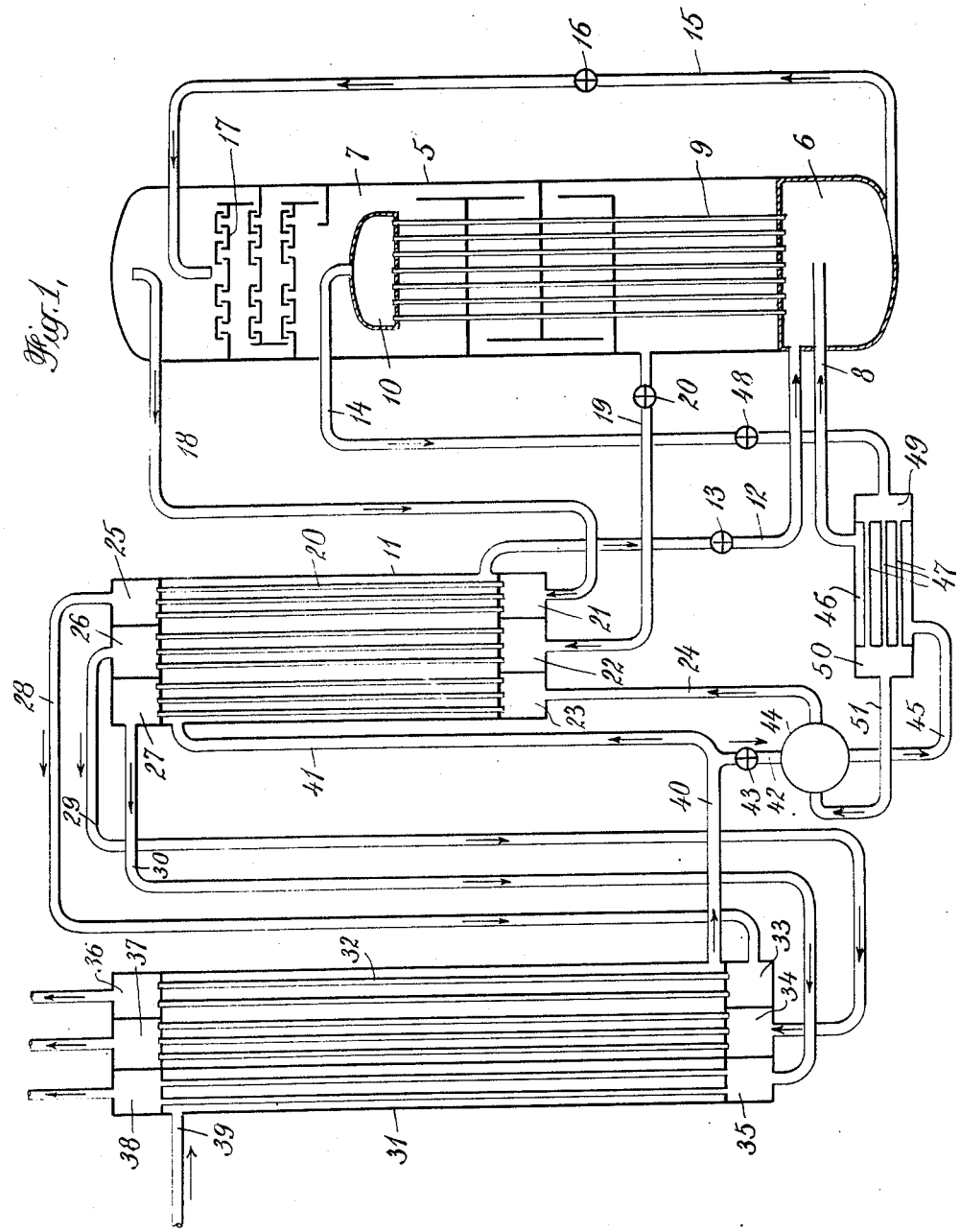
INVENTORS
Joseph L. Schlitt and
Walcott Dennis
BY
ATTORNEYS July 24, 1928.
J. L. SCHLITT ET AL
1,678,485
REFRIGERATION
Filed April 20, 1925
2 Sheets-Sheet 2
Fig. 2,
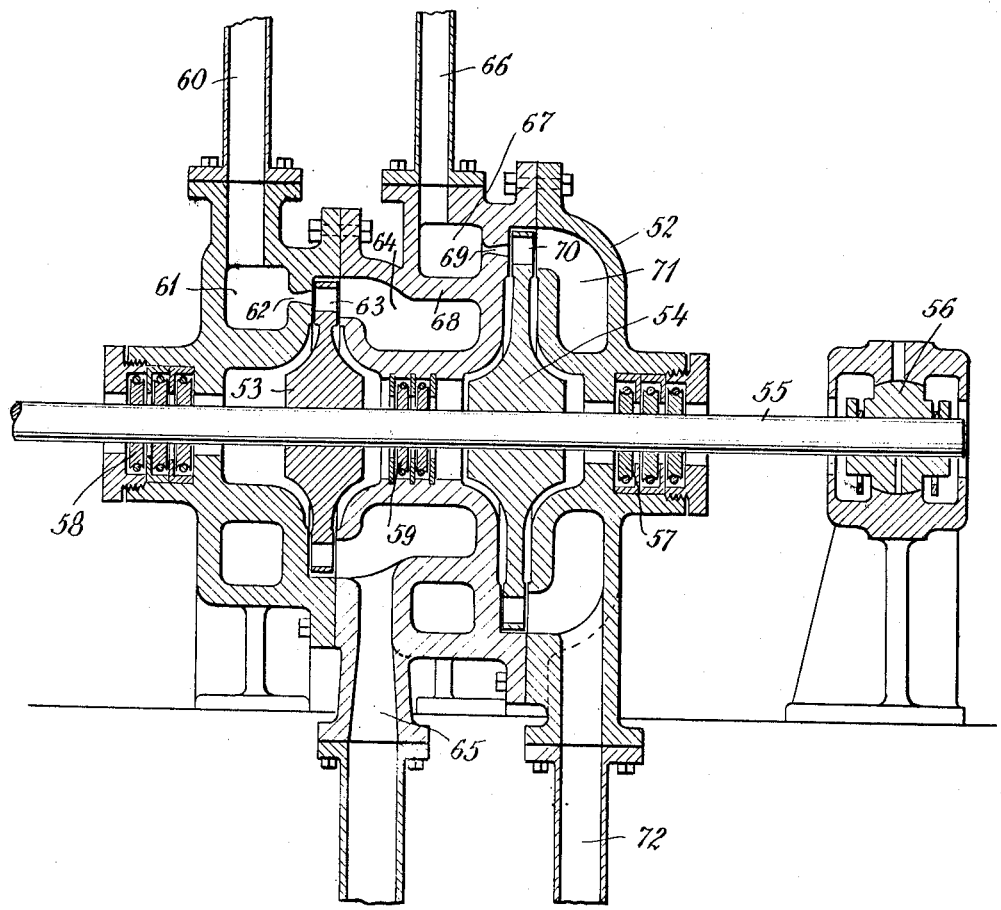
INVENTORS
Joseph L. Schlitt and
Walcott Dennis
BY
Pennie Davis Marvin & Edmonds
ATTORNEYS Patented July 24, 1928.

1,678,485

UNITED STATES PATENT OFFICE.

JOSEPH L. SCHLITT AND WALCOTT DENNIS, OF ELIZABETH, NEW JERSEY, ASSIGNORS TO AIR REDUCTION COMPANY, INCORPORATED, OF NEW YORK, N. Y., A CORPORATION OF NEW YORK.

REFRIGERATION.

Application filed April 20, 1925. Serial No. 24,350.

This invention relates to refrigeration, and particularly to the production of refrigeration by expansion of gases in the liquefaction of gaseous mixtures, the general purpose of the invention being to facilitate the expansion and improve the efficiency of the operation.

In a well known liquefaction system which is employed widely for the commercial separation of the constituents of the atmosphere, the air, after compression and cooling, is divided into two portions, one of which is expanded in a reciprocating expansion engine for the purpose of reducing the temperature of the gas and thus supplying refrigeration to the system. The balance of the air is delivered to a liquefier where it is subjected at its initial pressure to heat exchange with gaseous products of the separation. The liquid thus produced is delivered to a column after passing through a throttle valve together with the expanded portion of the air from the engine. The expanded air and vapors from the liquid are thus subjected to heat exchange with bodies of liquid accumulated in the system to produce additional liquid. The residual gas which remains unliquefied may be withdrawn from the system or subjected to a further liquefaction by heat exchange with additional bodies of liquid in the column. The liquid or liquids produced in the column are rectified by direct contact with vapors formed therein with the result that a liquid containing the more readily condensable constituent is separated from a gaseous effluent which consists principally of the less readily condensable constituent of the mixture. In separating the constituents of the atmosphere the liquid is principally oxygen and the gaseous effluent principally nitrogen. Likewise, the residual unliquefied gas from the first liquefaction in the column is principally nitrogen.

The residual unliquefied gas is still at a substantial pressure and it is capable, therefore, of expansion in a suitable engine with attendant recovery of the energy as has been suggested. The volume of this gas may be very considerable, particularly in the case where the amount of rectification in the column is limited. It is possible to so operate the column that 50 to 60% of the entering gaseous mixture is withdrawn at a substantial pressure. Consequently the possible power recovery under the most efficient conditions is considerable.

It is the object of this invention to provide an improved method of and apparatus for expanding gases in refrigerating systems to ensure maximum efficiency by reducing losses due to leakage of heat into the system and to friction in the mechanical parts of the system as well as by the beneficial application of heat exchange between the gases undergoing expansion.

Our invention depends upon the simultaneous expansion of two different gases under conditions permitting the application of the energy derived from the expansion directly to a single shaft with incidental heat exchange between the gases undergoing expansion. This purpose is accomplished by providing a turbine in which suitable chambers with the necessary wheels for expanding both gases are provided. The turbine is enclosed in a single housing with suitable inlets and outlets for the gases so that the original gaseous mixture, for example, may enter the turbine, pass through the wheel thereof, giving up its energy during expansion, and escaping from the housing through a suitable outlet. At the same time one of the gaseous products of the separation is similarly introduced, expanded to give up its energy to another wheel of the turbine, and permitted to escape therefrom. The pressure to which the original gaseous mixture is expanded is substantially the same as that at which the gaseous product enters the turbine and consequently the dividing walls between the outlet from the first stage of the turbine and the inlet to the second stage may be relatively thin. This permits transfer of heat with the least resistance from the expanded gaseous mixture to the gaseous product which is ordinarily much colder. The result is a desirable cooling of the expanded gaseous mixture before it enters the liquefaction system.

In order that the invention may be more clearly understood, reference is made to the accompanying drawing, in which Fig. 1 is a diagrammatic illustration of a liquefaction system embodying the invention, it being understood that the drawing is for illustrative purposes merely and that numerous changes and modifications may be made therein; and Fig. 2 is a longitudinal section through a turbine structure which is adapted for use in carrying out the invention.

Referring to Fig. 1 of the drawing, 5 indicates a column which, in the present modification, consists in compartments 6 and 7. The gaseous mixture, for example, air, is delivered to the compartment 6 through a pipe 8 and passes upwardly through a plurality of tubes 9 in heat exchange relation with bodies of liquid accumulated in the compartment 7. The tubes terminate at their upper ends in a header 10, and as the gaseous mixture travels upwardly through the tubes it is subjected to selective liquefaction with resulting production of a liquid enriched in the less volatile constituent, for example oxygen. The liquid flows backwardly through the tubes in contact with the entering gaseous mixture and is further enriched in the less volatile constituent. It leaves the tubes to join the liquid produced as hereinafter described in a liquefier 11, the liquid being delivered to the compartment 6 by a pipe 12 controlled by a valve 13. The residual unliquefied gas escapes from the header 10 through a pipe 14.

The liquid accumulated in the compartment 6 is delivered through a pipe 15 controlled by a valve 16 to the upper part of the column 5 wherein it flows downwardly over trays 17 in direct contact with vapors rising from the bodies of liquid surrounding the tubes 9. These vapors are formed by the vaporization of the bodies of liquids as the result of heat exchange with the gaseous mixture flowing through the tubes. There is a consequent rectification of the liquid which may be more or less complete, depending upon the length of the column and the number of trays therein. The result of the rectification is a liquid more or less enriched in the less volatile constituent, for example, oxygen, and a gaseous mixture which, if air is treated, consists principally of nitrogen. This mixture leaves as an effluent from the top of the column through a pipe 18. A portion of the vapor from the liquid which accumulates in the bottom of the compartment 7 is withdrawn through a pipe 19 controlled by a valve 20.

The liquefier 11 is provided with sets of tubes 20 communicating with chambers 21, 22 and 23 at one end thereof. Two of the gaseous products of the column may be delivered through the pipes 18 and 19 to the chambers 21 and 22. The third product, after expansion as hereinafter described, is delivered by a pipe 24 to the compartment 23. The various products pass through the tubes 20 to compartments 25, 26 and 27 at the opposite end of the liquefier and escape through pipes 28, 29 and 30 to an exchanger 31. This exchanger is provided with tubes 32 communicating with compartments 33, 34 and 35 to which the pipes 28, 29 and 30 are respectively connected. The cold products pass, therefore, through the tubes to compartments 36, 37, and 38 whence they escape to suitable receptacles or containers or to the atmosphere, depending upon the value of such products.

The air or other gaseous mixture enters the exchanger 31 through a pipe 39 and passes about the tubes 32, being thereby cooled. Escaping through a pipe 40 the gaseous mixture is divided and a portion is delivered through a pipe 41 to the liquefier 11. In passing about the tubes 20 the gaseous mixture is liquefied at its initial pressure and the liquid is delivered through the pipe 12 as hereinbefore described to the compartment 6 of the column. The balance of the air passes through a pipe 42 controlled by a valve 43 to a turbine 44 where it is expanded and thereby cooled, energy being recovered by the turbine and utilized for any desirable purpose. After expansion the gaseous mixture is withdrawn through a pipe 45 and delivered to an exchanger 46 which is designed to remove the "superheat" from the mixture before it enters the compartment 6 through the pipe 8. The exchanger 46 is provided, therefore, with a plurality of tubes 47 which are supplied with residual gas from the column through the pipe 14 and under the control of a valve 48. The residual gas is delivered to a compartment 49 and passes through the tubes 47 to a compartment 50. It thereby absorbs heat from the entering gaseous mixture and passes through a pipe 51 to another chamber of the turbine 44. It is still colder than the gaseous mixture and may absorb additional heat therefrom in the turbine while it is passing to and undergoing expansion. The cold expanded residual gas is delivered by the pipe 24 as hereinbefore described to the liquefier 20.

Referring to Fig. 2 of the drawing, the turbine comprises a housing 52 which provides various chambers required for the inlets and outlets and for the wheels 53 and 54. The latter are mounted on a shaft 55 which is supported in the usual type of self-aligning bearings 56 (only one of which is shown). One end of the shaft may carry gears or other power-transmitting means (not shown) whereby the power is delivered for any useful purpose. The shaft is surrounded at the ends of the housing 52 with packings 57 and 58 and a similar packing 59 is disposed about the shaft between the two stages to prevent leakage of gas along the shaft.

The high pressure gas enters the turbine through an inlet 60 communicating with a nozzle chamber 61. From this chamber the gas escapes through nozzles 62 to buckets 63 on the wheel 53. The latter is thus caused to rotate by the expansion of the gas under the well known principle of turbine expansion. After passing through the buckets the expanded gas enters a chamber 64 and escapes through an outlet 65.

The low pressure gas enters through an inlet 66 communicating with a nozzle chamber 67 which is adjacent to and separated from the chamber 64 by a thin wall 68. The use of this thin wall is possible because of the substantially equal pressures of the expanded gaseous mixture and the residual gas which enters through the inlet 66, and this in turn permits transfer of heat across the relatively thin wall previous to and during the expansion. The gas passes from the chamber 67 through nozzles 69 to the buckets 70 on the wheel 54 and thence escapes to a chamber 71 and an outlet 72.

The turbine as illustrated in Fig. 2 of the drawing corresponds to the turbine 44 of Fig. 1 and can be connected readily in the system as illustrated so as to permit the expansion of the high pressure gaseous mixture and the lower pressure residual gas with the advantages which have been suggested. Certain details of the turbine may be varied in accordance with well established practice in turbine design. The buckets, for example, will have the necessary form and pitch to accomplish the most effective expansion of the two gases at the temperatures and pressures at which these normally enter the turbine. Other details such as the arrangement of the nozzle and expansion chambers and of the packing for the shaft may be varied likewise.

As will be understood from the foregoing description, the entering gaseous mixture and the residual gas are expanded simultaneously and the energy recovered therefrom is applied to the shaft of the single turbine. The application of the torque from both turbine wheels to a single shaft results in automatic governing of the system. The turbine is adapted to conserve the refrigeration produced by the expansion as well as to transmit the power developed in the most efficient and economical way. Friction losses as well as losses due to heat leakage are reduced to a minimum. The number of packings which would be necessary otherwise and would introduce additional frictional losses are avoided and the cost of maintenance of the expansion machines is reduced materially.

We claim:

1. The method of improving the production of refrigeration in the liquefaction of gases, which comprises cooling a gaseous mixture to separate a liquid from a residual unliquefied gas, expanding the residual unliquefied gas and the entering gaseous mixture in heat exchange relation in a rotary expander and applying the torque produced by the separate expansions to a single shaft.

2. In an apparatus for the production of refrigeration, the combination of means for cooling a gaseous mixture to separate a liquid from a residual unliquefied gas and a turbine having separate expansion chambers for the residual gas and the entering gaseous mixture, a single shaft and separate expansion wheels mounted on the shaft in the expansion chambers.

3. In an apparatus for the production of refrigeration, the combination of means for cooling a gaseous mixture to separate a liquid from a residual unliquefied gas and a turbine having separate inlets and outlets for the residual gas and the entering gaseous mixture, a single shaft and separate expansion wheels on the shaft in the path between the inlets and outlets for the respective gases.

4. In an apparatus for the production of refrigeration, the combination of means for cooling a gaseous mixture to separate a liquid from a residual unliquefied gas and a turbine having separate expansion chambers for the residual gas and the entering gaseous mixture, a relatively thin-walled partition between the expansion chambers, a single shaft and separate expansion wheels mounted on the shaft in the expansion chambers.

In testimony whereof we affix our signatures.

JOSEPH L. SCHLITT.
WALCOTT DENNIS.